United States Patent
Morgan

(10) Patent No.: US 10,186,362 B2
(45) Date of Patent: Jan. 22, 2019

(54) SOLENOID WITH NON-MAGNETIC FRONT BEARING

(71) Applicant: BorgWarner Inc., Auburn Hills, MI (US)

(72) Inventor: Kenneth W. Morgan, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/310,205

(22) PCT Filed: May 20, 2015

(86) PCT No.: PCT/US2015/031721
§ 371 (c)(1),
(2) Date: Nov. 10, 2016

(87) PCT Pub. No.: WO2015/179486
PCT Pub. Date: Nov. 26, 2015

(65) Prior Publication Data
US 2017/0243683 A1 Aug. 24, 2017

Related U.S. Application Data

(60) Provisional application No. 62/002,474, filed on May 23, 2014.

(51) Int. Cl.
*H01F 7/08* (2006.01)
*F16C 33/12* (2006.01)
(Continued)

(52) U.S. Cl.
CPC ............ *H01F 7/081* (2013.01); *F16C 33/12* (2013.01); *F16C 33/121* (2013.01); *H01F 7/128* (2013.01);
(Continued)

(58) Field of Classification Search
CPC .. F16K 31/02–31/105; H01F 2007/085; H01F 2007/163
(Continued)

(56) References Cited

U.S. PATENT DOCUMENTS

| 4,153,890 A | 5/1979 | Coors |
| 6,786,467 B2 | 9/2004 | Gagnon |

(Continued)

FOREIGN PATENT DOCUMENTS

| DE | 3042752 A1 * | 5/1982 | ........... H01F 7/1607 |
| DE | 3527995 A1 | 2/1987 | |

(Continued)

OTHER PUBLICATIONS

International Search Report for International Application No. PCT/US2015/031721, dated Aug. 17, 2015.
(Continued)

*Primary Examiner* — Ramon M Barrera
(74) *Attorney, Agent, or Firm* — Warn Partners, P.C.

(57) ABSTRACT

A solenoid actuator is provided having an armature assembly with a separate joined shunt side bearing consisting of a non-magnetic or slightly magnetic material. The material of the shunt side bearing prevents significant amounts of magnetic flux transferring through the lower bearing area of the armature assembly in the radial direction.

13 Claims, 2 Drawing Sheets

(51) Int. Cl.
*H02K 7/08* (2006.01)
*H01F 7/128* (2006.01)
*H01F 7/16* (2006.01)

(52) U.S. Cl.
CPC ............ *H01F 7/1607* (2013.01); *H02K 7/08* (2013.01); *F16C 2202/40* (2013.01); *H01F 2007/085* (2013.01); *H01F 2007/163* (2013.01)

(58) Field of Classification Search
USPC .................................... 251/129.01–129.22
See application file for complete search history.

(56) References Cited

U.S. PATENT DOCUMENTS

| | | | |
|---|---|---|---|
| 6,929,242 B2 | 8/2005 | Kirsch et al. | |
| 8,581,683 B2* | 11/2013 | Hoppe | H01F 7/081 251/129.15 |
| 2001/0013584 A1 | 8/2001 | Matsusaka et al. | |
| 2010/0109825 A1 | 5/2010 | Yamagata et al. | |
| 2010/0308244 A1 | 12/2010 | Oikawa et al. | |
| 2014/0352971 A1* | 12/2014 | Renshaw | F16K 31/0613 166/335 |

FOREIGN PATENT DOCUMENTS

| | | | | |
|---|---|---|---|---|
| DE | 102005051178 A1 * | 4/2007 | ......... | F16K 31/0603 |
| KR | 20100022218 A | 3/2010 | | |
| WO | 2013116031 A1 | 8/2013 | | |
| WO | 2013192003 A1 | 12/2013 | | |
| WO | 2014017639 A1 | 1/2014 | | |

OTHER PUBLICATIONS

Extended European Search Report for PCT International Application No. PCT/US201/031721, dated Dec. 22, 2017.

* cited by examiner

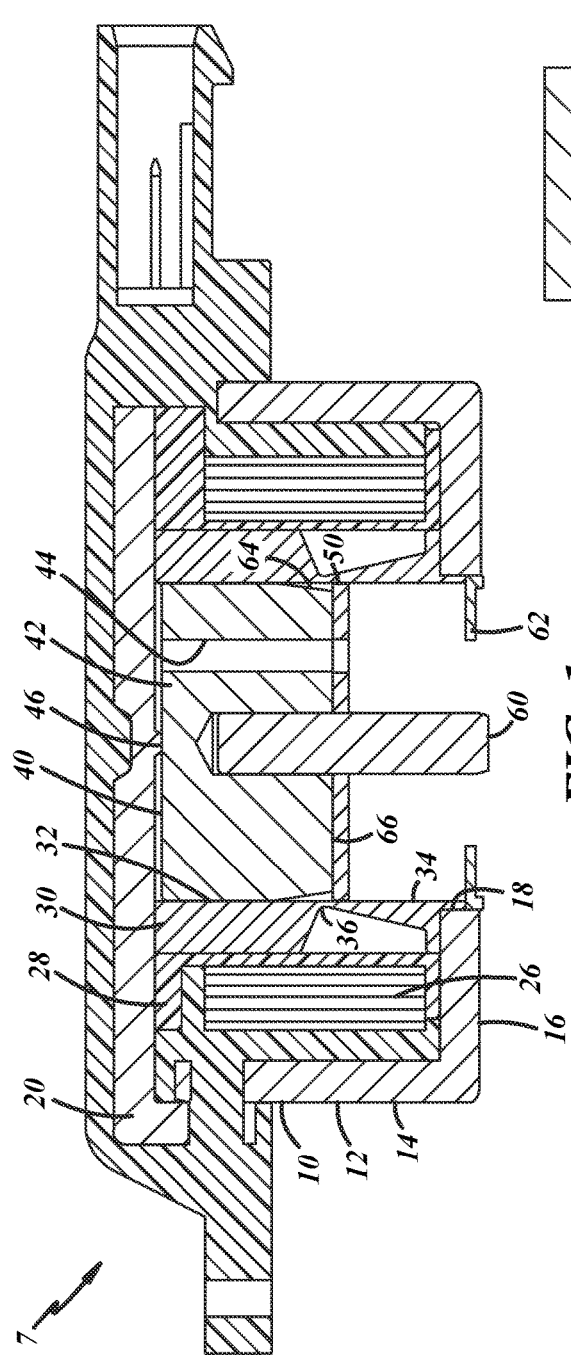
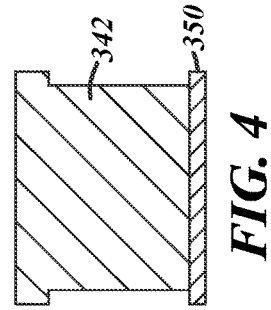
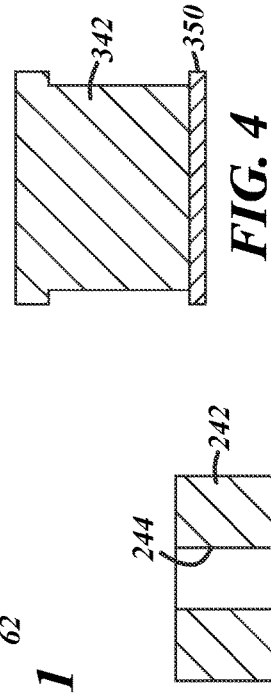
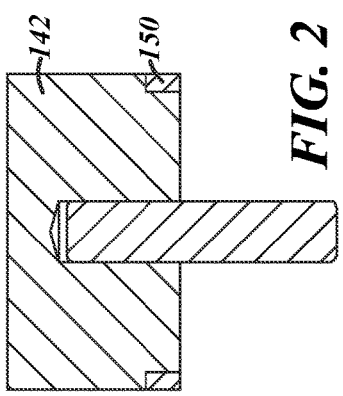

US 10,186,362 B2

SOLENOID WITH NON-MAGNETIC FRONT BEARING

FIELD OF THE INVENTION

The present invention relates to solenoid actuators.

BACKGROUND OF THE INVENTION

Most solenoid actuators have a ferromagnetic casing. The casing encircles a coil which is typically wrapped in a polymeric bobbin. Within the coil is a core assembly or core. An armature (or armature assembly), slides within the core (or core assembly). The armature is moved via flux transfer as current is run through the coil. The flux loop is completed by flux transfer from the casing to the core to the armature and back through the core to the casing. Armature translation is accomplished by transfer of flux from the upper section of the core (sometimes referred to as the flux return or flux tube) through the armature to the lower section of the core (shunt end or shunt). For this reason, there is a thin section of the core in between the upper and lower sections (commonly referred to as the flux choke) to reduce the amount of flux directly transferring from the upper to lower core.

While flux is intended to travel from the upper to lower core through the armature, it is desirable for this flux path to be more axially oriented than radially oriented in the lower section of the core (shunt end). Radial flux transfer in this portion of the assembly leads to higher magnetic side loading of the armature and thus higher frictional forces. It is desirable that the armature be designed to reduce the relative amount of side loading of the armature within the core.

In order to guide the armature through the core and minimize armature misalignment, it is desirable to maximize the bearing length. With a continuous steel armature, as the bearing length is increased, the lower section of the bearing goes deeper into the shunt, causing higher side loading. Even when the steel armature or core bearing surface is plated or coated in some way, side loads remain high. It is desirable to decouple the lower bearing from the magnetic portion of the armature.

SUMMARY OF THE INVENTION

To make manifest the above noted and other desires, a revelation of the present invention is brought forth. In a preferred embodiment the present invention endows a freedom of a solenoid actuator with an armature assembly including a base magnetic material portion with a separate shunt side bearing portion attached to a base magnetic material portion. The shunt side bearing consists of a nonmagnetic or slightly magnetic material to prevent significant amounts of flux from transferring through a lower bearing area of the armature assembly in the radial direction. The nonmagnetic or semi-magnetic material can be joined to a base magnetic material portion of the armature assembly in any number of ways including but not limited to press fitting, attachment to an intermediate pin, sintering, gluing, molding, brazing, etc. In the case of coated armatures, the shunt side bearing can be coated or plated along with or separately from the base armature material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a sectional view of a normally low control pressure solenoid actuator according to the present invention; and FIG. 2 is a sectional view of an armature assembly in an alternate preferred embodiment solenoid actuator according to the present invention.

FIG. 3 is a sectional view of an alternate preferred embodiment armature assembly according to the present invention.

FIG. 4 is a sectional view of another alternate preferred embodiment armature assembly according to the present invention.

DETAILED DESCRIPTION OF THE PREFERRED EMBODIMENTS

Figure 5:
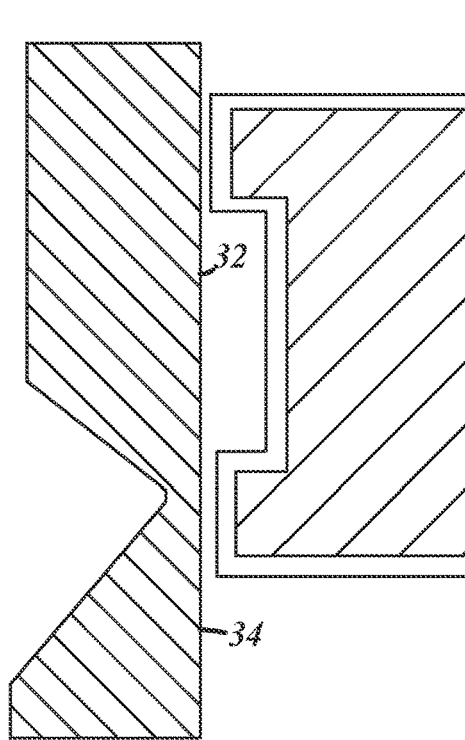
FIG. 5 is a schematic view of a prior art armature assembly.

The following description of the preferred embodiments is merely exemplary in nature and is in no way intended to limit the invention, its application, or uses.

Referring to FIG. 1, a solenoid actuator 7 according to the present invention is provided. The solenoid actuator 7 has a ferromagnetic can or casing 10. The casing includes a lower housing 12 (as shown in FIG. 1). The lower housing has a generally vertical portion 14 joined to an end cap 16. The end cap 16 has a central opening 18. The lower housing 12 is press fit into an upper housing 20. Positioned within the casing 10 is a coil 26. The coil 26 is typically fabricated from a non-magnetic material such as copper. The coil 26 is wrapped on an outer diameter of a polymeric bobbin 28. Encircled by the coil 26 is core 30. The core 30 has an upper portion providing a flux return herein referred to as the flux tube 32. The core 30 has another portion referred to as the shunt 34. Separating the flux tube 32 from the shunt 34 is a flux choke 36 which is generated by the narrowing of the core. The core 30 is magnetically connected with the casing 10. In FIG. 1, the flux tube 32 and shunt 34 are integral, however in other embodiments (not shown) the flux choke 36 can be provided by an axial gap separation of the flux tube 32 and shunt 34.

Slidably mounted in the core 30 is an armature assembly 40. The armature is fabricated from at least two separate components fabricated from different types of material. The first component is a base fabricated from a base magnetic material. In the example shown, the base material is low carbon steel. The base material 42 has an axial bore 44 axially extending there through to allow hydraulic oil to be on both sides of the armature 40. The armature assembly 40 in its extreme retracted position abuts a magnetic stop 46 provided in the housing 20. The armature assembly 40 also has joined thereto a bearing adjacent to the flux choke 36 or hereinafter referred to as the shunt side bearing 50. The shunt side bearing 50 is fabricated from a material having significantly less magnetic permeability of at least fifty percent less of that of the magnetic carbon steel material.

The shunt side bearing 50 can be fabricated from a polymeric material, copper, aluminum, stainless steel, zinc, ceramic materials and/or alloys or composites thereof. The shunt side bearing 50 can be attached to the armature base material 42 by one or more of the following methods including an interference fit, sintering, adhesive connection, molded connection, brazing and/or bonding. In many applications, the shunt side bearing will be attached to an axial face of the base magnetic material 42. The shunt side bearing 50 need not cover the entire face of the armature assembly 40, but it is preferred that it have a radial width or thickness of at least 350 microns and an axial length of 200 microns adjacent the shunt side bearing. Connected with the armature 40 is a transported member 60. The shunt side bearing 50 can be first joined to the transported member 60 and then connected (to the armature base material) by the transported member 60 being fixably connected with a base material 42 of the armature. The solenoid actuator 7 also has a stop 62 to limit travel of the armature. Directly adjacent to the shunt side bearing 50 the base material 42 has a reduced diameter axial wedge shaped section 64 to further ensure contact of the shunt side bearing 50. The reduced diameter axial wedge shaped section 64 minimizes radial flux transfer and maximizes axial flux transfer for this portion of the armature. (Note: In FIG. 1 the radial width of section 64 is exaggerated for clarity of illustration.) The above noted feature allows for customization of the force versus current versus axial position characteristics of the solenoid actuator.

In operation the solenoid 7 in its typical rest position has the armature assembly 40 abutted with the stop 46 by virtue of a biasing spring not shown or by virtue of a spring bias provided against the transported member 60 by an apparatus not shown. When the coil 26 is actuated, magnetic flux travels through the casing to the flux tube core into the armature assembly 40 out through the face 66 of the base material and then into the shunt 34. This causes a downward force on the armature causing the armature to slide downward as shown in FIG. 1 thrusting the transported member 60 forward. Lateral force on the shunt side bearing 50 is virtually eliminated.

Optionally if desired both the shunt side bearing 50 and the armature base material 42 can have their outer perimeter coated with a light coating of a nickel or other non-magnetic alloy to facilitate the sliding movement of the armature within the core 30.

Referring to FIG. 2 an alternate preferred embodiment armature according to the present is provided with a base material 142 with a press fit shunt side bearing 150. Shunt side bearing 150 can be fabricated from the various materials noted for shunt side bearing 50.

FIG. 3 illustrates an armature assembly according to the present invention wherein the shunt side bearing 250 has an inner core that press fits with an axial bore 244 to attach with a base magnetic material 242. Similar to shunt side bearing 50, shunt side bearing 250 covers a majority of the axial face of the base magnetic material 242.

FIG. 4 illustrates an armature assembly wherein the base magnetic material has an integrated rear bearing. A shunt side non-magnetic material bearing 30 has a diameter essentially equal to that of the base magnetic material.

Figure 6:
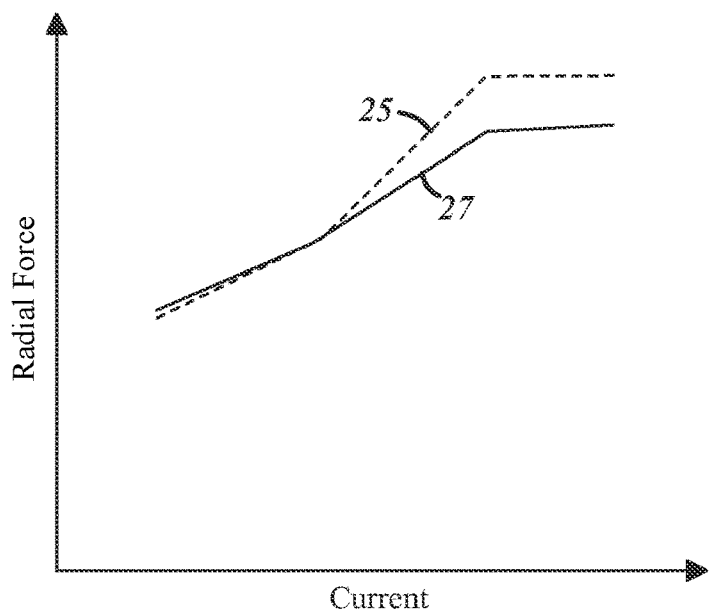
FIG. 6 is a graphic display of radial side forces in armature assemblies.

FIG. 6 illustrates the reduction in radial force experienced in the shunt side bearing 50 of FIG. 1, see line 27 versus the higher radial force experienced by the shunt side bearing of FIG. 5. (Note: the shunt side bearing of FIG. 5 is exaggerated in dimension for clarity of illustration.)

While the invention is shown in FIGS. 1-4 as only a solenoid motor or actuator assembly, it can be combined with various pin, spool or other components to achieve any number of solenoid powered mechanical or valve functions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid actuator comprising:
   a casing;
   a coil positioned within said casing;
   a core including a flux return and shunt, said flux return and shunt being axially separated by a flux choke, said core being magnetically connected with said casing and encircled by said coil;
   an armature assembly slidably mounted within said core, said armature assembly having a base of magnetic material and a separate shunt side bearing joined to said base magnetic material, said bearing being fabricated from a material having a having at least 50% less magnetic permeability than said base magnetic material; and
   wherein said armature base material adjacent said shunt side bearing has a reduced diameter axial wedge shape section.

2. A solenoid actuator as described in claim 1 wherein said shunt side bearing has a radial width of at least 300 microns and an axial length of at least 200 microns.

3. A solenoid actuator as described in claim 1 wherein said armature shunt side bearing material is fabricated from a group of materials taken from polymeric materials, copper, aluminum, stainless steel, zinc, ceramic materials and alloys or composites thereof.

4. A solenoid actuator as described in claim 1 wherein said shunt side bearing is joined to said armature base material by one or more of the following methods including interference fit, sintering, adhesive, molded, braising, and bonding.

5. A solenoid actuator as described in claim 1 wherein said armature is coated.

6. A solenoid actuator as described in claim 1 wherein a transported member is moved by said armature.

7. A solenoid actuator as described in claim 6 wherein said transported member is affixed to said armature and wherein said shunt side bearing is affixed to said transported member.

8. A solenoid actuator as described in claim 1 wherein said armature shunt side bearing is coated.

9. A solenoid actuator as described in claim 1 wherein said shunt side bearing covers a major portion of an axial face of said base material.

10. A solenoid actuator comprising:
    a casing including a lower housing press fit into an upper housing;
    a coil positioned within said casing;
    a core including a flux tube and shunt, said flux tube and shunt being axially separated by an integral flux choke, said core being magnetically connected with said casing and encircled by said coil; and
    an armature assembly slidably mounted within said core, said armature assembly having a base of magnetic material and a separate shunt side bearing joined to said base magnetic material, said shunt side bearing having a radial width of at least 350 microns and an axial length of at least 200 microns of axial length, said shunt side bearing being fabricated from a nonmagnetic material and wherein said base magnetic material directly adjacent to said shunt side bearing has a reduced diameter axial wedge shaped section.

11. A solenoid actuator comprising:
a casing;
a coil positioned within said casing;
a core including a flux return and shunt, said flux return and shunt being axially separated by a flux choke, said core being magnetically connected with said casing and encircled by said coil;
an armature assembly slidably mounted within said core, said armature assembly having a base of magnetic material and a separate shunt side bearing joined to said base magnetic material, said bearing being fabricated from a material having at least 50% less magnetic permeability than said base magnetic material; and
wherein a transported member is moved by said armature, said transported member is affixed to said armature, and wherein said shunt side bearing is affixed to said transported member.

12. A solenoid actuator as described in claim 11 wherein said armature base material adjacent said shunt side bearing has a reduced diameter axial wedge shaped section.

13. A solenoid actuator comprising:
a casing;
a coil positioned within said casing;
a core including a flux return and shunt, said flux return and shunt being axially separated by a flux choke, said core being magnetically connected with said casing and encircled by said coil;
an armature assembly slidably mounted within said core, said armature assembly having a base of magnetic material and a separate shunt side bearing joined to said base magnetic material, said bearing being fabricated from a material having at least 50% less magnetic permeability than said base magnetic material, said armature assembly base magnetic material having a bore, said bearing having a portion press fit within said armature base magnetic material bore.

* * * * *